United States Patent [19]

Luczak et al.

[11] Patent Number: 4,677,092

[45] Date of Patent: Jun. 30, 1987

[54] ORDERED TERNARY FUEL CELL CATALYSTS CONTAINING PLATINUM AND COBALT AND METHOD FOR MAKING THE CATALYSTS

[75] Inventors: Francis J. Luczak, Glastonbury; Douglas A. Landsman, West Hartford, both of Conn.

[73] Assignee: International Fuel Cells Corporation, South Windsor, Conn.

[21] Appl. No.: 812,106

[22] Filed: Dec. 23, 1985

Related U.S. Application Data

[60] Continuation-in-part of Ser. No. 575,360, Jan. 30, 1984, Pat. No. 4,613,582, which is a division of Ser. No. 459,002, Jan. 17, 1983, Pat. No. 4,447,506.

[51] Int. Cl.$^4$ .................. B01J 21/18; B01J 23/64; B01J 23/89
[52] U.S. Cl. ............................................. 502/185
[58] Field of Search ............................. 502/185, 313

[56] References Cited

U.S. PATENT DOCUMENTS

| | | | |
|---|---|---|---|
| 3,212,930 | 10/1965 | Thompson et al. | 117/213 |
| 3,276,911 | 10/1966 | Schoeneweis | 136/120 |
| 3,291,753 | 12/1966 | Thompson | 252/447 |
| 3,311,508 | 3/1967 | Biddick et al. | 136/120 |
| 3,380,934 | 4/1968 | Batzold | 502/339 |
| 3,432,362 | 3/1969 | Kroll | 429/34 |
| 3,433,680 | 3/1969 | Archer et al. | 136/120 |
| 3,449,169 | 6/1969 | Rhodes | 136/86 |
| 3,701,687 | 10/1972 | Grubb et al. | 136/86 R |
| 3,943,006 | 3/1976 | Baker et al. | 136/120 FC |
| 4,145,314 | 3/1979 | Fung et al. | 252/437 |
| 4,316,944 | 2/1982 | Landsman et al. | 429/44 |
| 4,358,475 | 11/1982 | Brown et al. | 427/34 |
| 4,361,631 | 11/1982 | Iacovangelo et al. | 429/40 |
| 4,447,506 | 5/1984 | Luczak et al. | 429/44 |

FOREIGN PATENT DOCUMENTS

| | | |
|---|---|---|
| 34673 | 8/1980 | Japan . |
| 34674 | 8/1980 | Japan . |
| 1047933 | 11/1966 | United Kingdom . |

OTHER PUBLICATIONS

Above References were Cited in Parent Application Ser. No. 575,360.

*Primary Examiner*—W. J. Shine
*Attorney, Agent, or Firm*—Gene D. Fleischhauer

[57] ABSTRACT

A ternary alloy catalyst for the electrochemical reduction of oxygen is disclosed. Various methods of making the catalyst are developed. The catalyst has an ordered structure which improves stability and the specific activity of the catalyst.

23 Claims, 6 Drawing Figures

○ Platinum Atoms

◉ Cr-Co Atoms

ORDERED TERNARY FUEL CELL CATALYSTS CONTAINING PLATINUM AND COBALT AND METHOD FOR MAKING THE CATALYSTS

This is a Continuation-in-Part of U.S. application Ser. No. 575,360 filed on Jan. 30, 1984, now U.S. Pat. No. 4,613,582, which was a division of application Ser. No. 459,002 filed on Jan. 17, 1983, now U.S. Pat. No. 4,447,506.

DESCRIPTION

1. Technical Field

The present invention relates to noble metal catalysts and especially to ordered ternary alloys of platinum for use in fuel cell electrodes and other catalytic structures.

2. Background Art

A fuel cell is an electrochemical device in which the energy from a chemical reaction is converted directly to direct current electricity. The basic concept, which was described by Sir William Grove in about 1840, comprises an anode and a cathode separated by an electrolyte.

During operation, a continuous flow of fuel, commonly hydrogen, is fed to the anode while, simultaneously, a continuous flow of oxidant, commonly air, is fed to the cathode. The fuel is oxidized at the anode with a release of electrons through the agency of a catalyst. These electrons are conducted from the anode through wires external to the cell to the cathode where the oxidant is reduced and the electrons are consumed, again through the agency of a catalyst. The constant flow of electrons from the anode to the cathode constitutes an electrical current which can be made to do useful work.

The type of fuel cell which is in the most advanced state of development, and which is being used in commercial power plants to generate electricity at the 10–5,000 KW level, contains concentrated phosphoric acid as electrolyte and operates at 325°–450° F.

The efficiency at which the cell operates is determined by several parameters, not the least of which is the activity of the cathode catalyst. This activity is measured by the rate at which the electrochemical reduction of the oxidant proceeds on the surface of the catalyst in the presence of the electrolyte at a specified temperature and electrochemical potential. Much effort has been expended over the years to find inexpensive, highly active catalysts. However, the choice of materials suitable for this purpose is severely limited since any catalyst must not only have a high activity for the electrochemical reduction of oxygen, but must be capable of withstanding a working environment of relatively high temperatures while exposed to a strong acid. In particular, a catalyst must have acceptable stability, that is, the ability to maintain its physical and chemical integrity after long periods (thousands of hours) in the hostile environment of the fuel cell.

Initially, catalysts were made only of platinum or other noble metals, as these materials were best able to withstand the corrosive environment of the electrochemical cell. Later, these noble metals were dispersed over the surface of electrically conductive supports (e.g., carbon powder, such as carbon-black) to increase the surface area of the catalysts which in turn increased the number of reactive sites leading to improved efficiency of the cell. It was then discovered that certain alloys of noble metals exhibited increased catalytic activity, further increasing fuel cell efficiencies. Some of these alloys are platinum-chromium (commonly assigned U.S. Pat. No. 4,316,944) and platinum-vanadium (commonly assigned U.S. Pat. No. 4,202,934). These increases in fuel cell efficiency coupled with the increase in cost of other energy sources contributes to even greater utilization of the fuel cell. The search continues for stable catalysts with increased activity for the electrochemical reduction of oxygen over that which is presently available to improve the performance of fuel cells further and hence to reduce their capital and operating costs.

DISCLOSURE OF INVENTION

The present invention is directed to a noble metal ternary alloy catalyst having a structure which is an ordered solid solution (that is, an ordered catalyst) and having a mass activity for the electrochemical reduction of oxygen at least twice that of the unalloyed noble metal. In one embodiment, this ordered catalyst comprises a ternary alloy of platinum, chromium and cobalt supported on an electrically conductive carbon-black and has a mass activity greater than two and one-half times that of the unalloyed noble metal.

Another aspect of the invention is a fuel cell containing the above-described catalyst.

Another aspect of the invention is processes for making the above-described catalyst.

The foregoing features and advantages of the present invention will become more apparent in light of the following detailed description of the best mode for carrying out the invention and in the accompanying drawings.

BEST MODE FOR CARRYING OUT THE INVENTION

In the following discussion of this invention and in the appended claims, whenever catalytic activity comparisons are made they are comparisons of mass activity. In the present context, the mass activity of a cathode catalyst is defined as the maximum current obtained from one milligram of the catalyst when fabricated into a gas diffusion electrode and operated at 0.9 volt in oxygen at one atmosphere pressure in 99% phosphoric acid at 375° F. The potential is measured relative to an unpolarized H$_2$/Pt reference electrode at the same pressure and temperature in the same electrolyte. Although the test electrode may contain more or less than 1 milligram of the catalyst, the current is normalized to what would be obtained from this amount and the mass activity is expressed as milliamps per milligram of the platinum in the catalyst.

An increase in the mass activity of a catalyst may be achieved by either increasing the surface area of the catalyst, therefore creating a greater number of reactive sites, or by increasing its specific activity. The specific activity is the O$_2$ reduction current per unit surface area of the catalyst (i.e. mA/cm$^2$). The greater mass activity of the ordered ternary alloy made by process II of the present invention in comparison to the mass activities of unalloyed and binary alloy catalysts and disordered ternary catalysts of the same composition results from an increase in the specific activity and an increase in surface area.

The mass activity of the ordered catalyst made by process I of the present invention is greater than that of unalloyed and binary alloy catalysts but less than that of disordered ternary catalysts of the same composition and results from the same increase in specific activity as process II catalysts but with a decrease in surface area. Nevertheless, process I and process II ordered catalysts share an important advantage—both of these ordered catalysts are more stable than disordered catalysts (that is, have greater compositional chemical and structural invariance with time) in the hostile environment of a hot phosphoric acid fuel cell.

Figure 1:
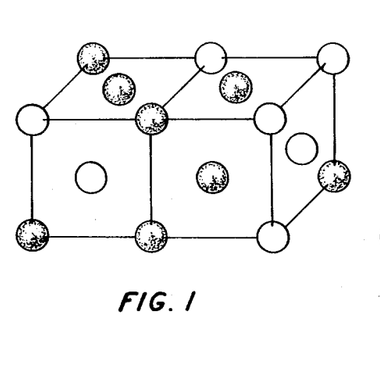
FIG. 1 is a space lattice schematically relating the atomic arrangement of a disordered alloy of platinum and a mixture of composition chromium and cobalt with unshaded circles representing atoms of platinum and shaded circles representing atoms of the mixture of composition chromium and cobalt.
Figure 2:
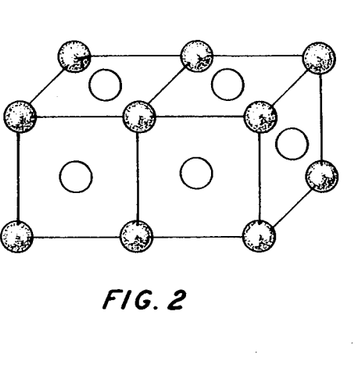
FIG. 2 is a space lattice schematically relating the atomic arrangement of an ordered alloy of platinum (form $Pt_3M$) and a mixture of composition chromium and cobalt.
Figure 3:
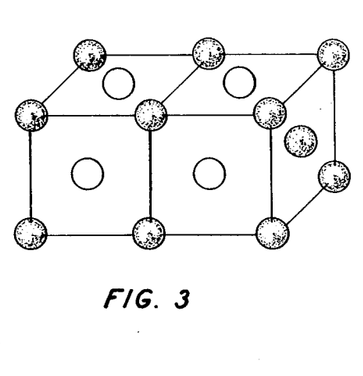
FIG. 3 is a space lattice schematically relating the atomic arrangement of an ordered alloy of platinum (form $PtM$) and a mixture of composition chromium and cobalt.

As discussed in a leading text (*Structure of Metals*, Barrett and Massalski, McGraw Hill-New York 1966), the process of ordering any solid solution involves a change from a statistically nearly random distribution of atoms among the atomic sites in the crystal space lattice of the metal alloy into a more regular arrangement, whereby designated sites are occupied predominantly by one kind of atom. As shown in FIGS. 1-3, many alloys of platinum crystalize in a face centered cubic lattice. In a disordered alloy of platinum and a mixture of compositon chromium and cobalt as shown in FIG. 1, for example, any given atomic site is occupied indifferently by either chromium and cobalt or by platinum atoms. On ordering, as shown in FIG. 2 for Pt$_3$ (CoCr) and in FIG. 3 for Pt(CoCr), the platinum atoms and the mixture of chromium and cobalt atoms segregate more or less completely to designated atomic sites, so that the resulting arrangement can be described as a lattice of a mixture of atoms (chromium and cobalt) interpenetrating a lattice of platinum atoms. The segregation of atoms to particular atom sites may take place with little or no deformation of the lattice, creating an "ordered solid solution", or "superlattice", or "superstructure", out of a random solid solution.

In a disordered solid solution, crystallographically equivalent planes of atoms are identical (statistically) with one another, but in an ordered system this need not be true. For example, alternate planes of a set may become platinum rich and cobalt-chromium rich planes respectively. Thus, the distance between identical planes ay become twice the distance between identical planes of the disordered alloy (or some other multiple of this distance). Hence, the structures of ordered alloys usually produce diffraction patterns that have additional Bragg reflections, the "superlattice lines" associated with the new and larger spacings which are not present in patterns of the disordered alloys.

Figure 4:
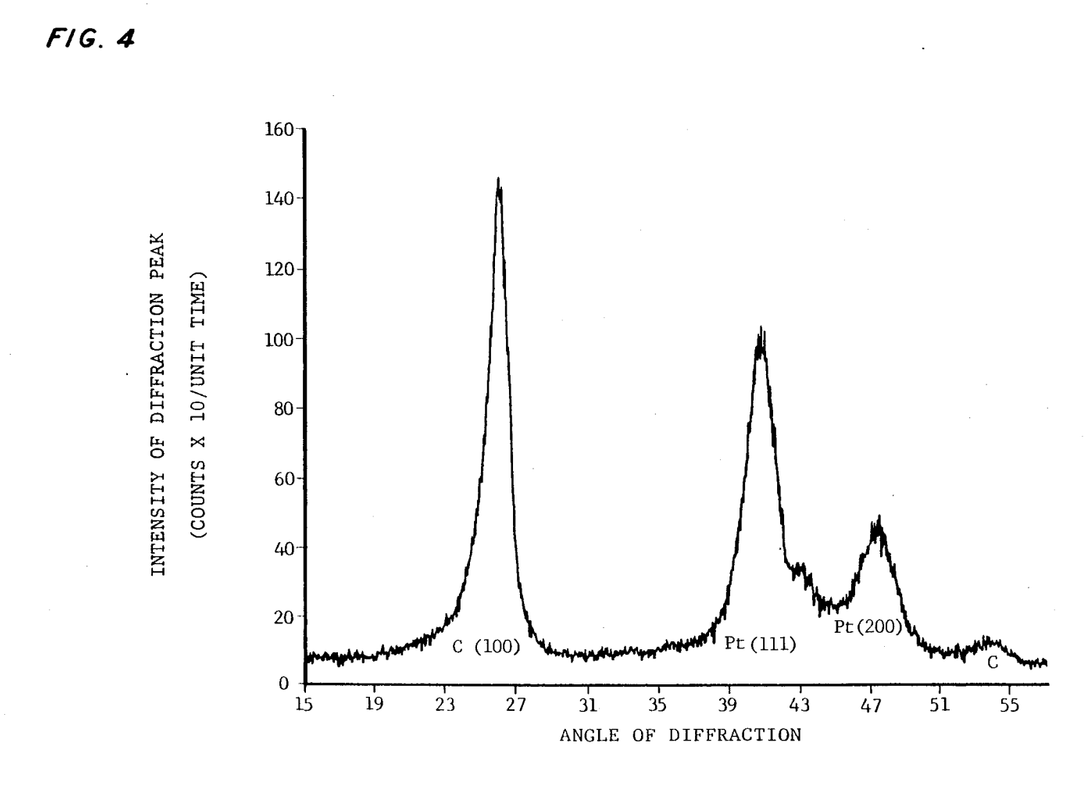
FIG. 4 is a diffraction pattern for a disordered ternary alloy of platinum and a mixture of composition chromium and cobalt showing the intensity of the diffraction peak in counts per unit of time versus the angle of diffraction.
Figure 5:
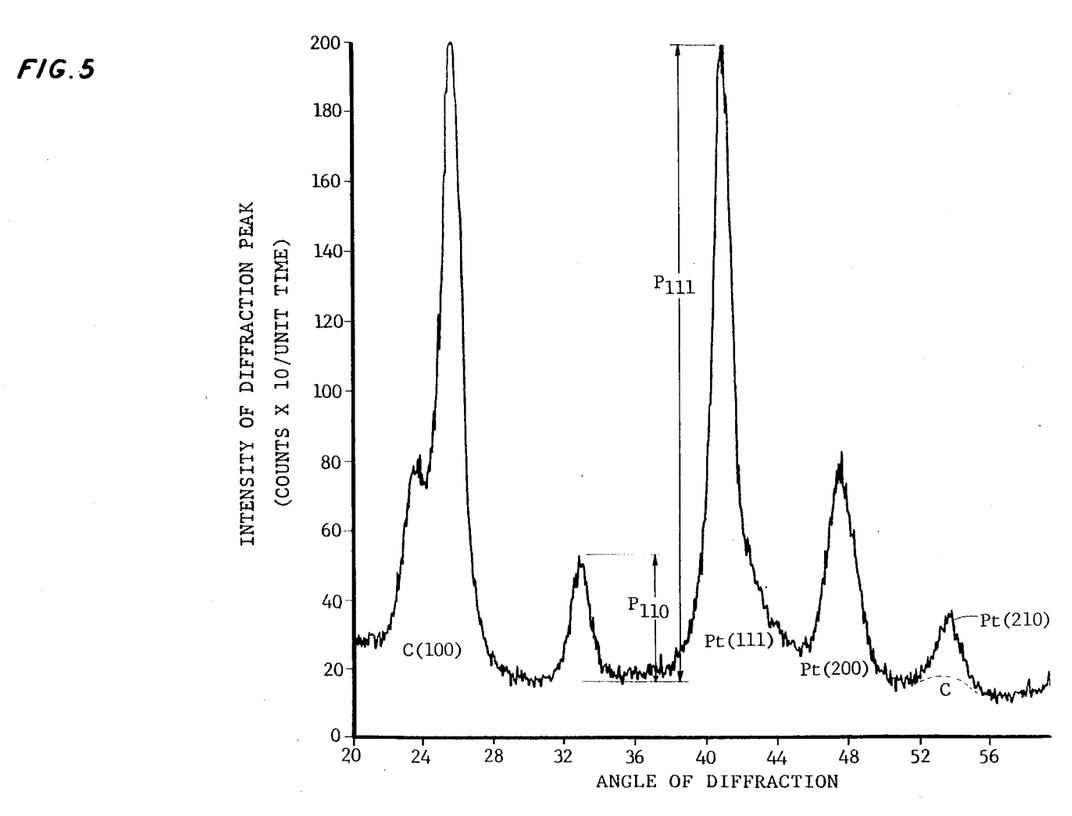
FIG. 5 is a diffraction pattern for an ordered ternary alloy of platinum and a mixture of composition chromium and cobalt showing the intensity of the diffraction peak in counts per unit time versus the angle of diffraction.

FIG. 4 is an example of a diffraction pattern for a disorderd ternary alloy of platinum, chromium, and cobalt, and FIG. 5 an example of diffraction pattern for an ordered ternary alloy of platinum and chromium-cobalt produced by the processes of the present invention. These X-ray diffraction patterns were produced using a Siemens D-500 Diffractometer with a copper tube that produces X-rays of wavelength 1.5405 Å. The planes of the face centered cubic lattice of the platinum alloy, as designated by the Miller Indices (h, k, l,), normally give rise to the diffraction peaks shown in FIG. 4 for disordered and ordered alloys. These diffraction peaks are associated with the (111), (200), and (220) planes. The positions of these peaks enable the calculation of the lattice oarameter of the cube (length of the cube side). For the ordered structure (that is, an ordered solid solution), added diffraction peaks or superlattice peaks are visible. These superlattice diffraction peaks correspond to the (100), (110), and (210) planes. The relative intensity of the normal and superlattice peaks indicate the relative amounts of solid solution and ordered alloy concentrations. The most important of these peaks is the 110 peak. As used herein, a predominately ordered solution exists in alloys having a (110) diffraction peak P$_{110}$ which is equal to or greater than five percent of (111) diffraction peak, P$_{111}$ and preferably is of an intensity P$_{110}$ which is greater than ten percent of P$_{111}$ in intensity, showing nearly complete ordering of the catalyst, (that is, greater than ninety weight percent of the catalyst).

The basic processes for producing the subject invention, namely an ordered ternary alloy containing platinum and cobalt, may be used to produce other ordered ternary catalysts recited in this application. The process for producing an ordered ternary alloy includes the steps for making a disordered ternary alloy. These steps comprise, first, intimately contacting a finely divided noble metal such as one selected from the group of platinum, iridium, rhodium, and palladium) dispersed on a carbon support with a solution containing a compound of cobalt and a solution containing a compound of one of the elements from transition Groups IV to VII (Ti, V, Cr, Mn, Zr, etc.). The intimate contact is accomplished by continuous stirring of the mixture and adjusting the acidity to promote deposition, probably by adsorption, of the compounds on the supported catalyst. Alternatively, the supported platinum catalyst can be dispersed in water. To this slurry, solutions of the alloying species can be added and stirred for good mixing. This mixture can then be heated to evaporate the water content. This technique is commonly known as the impregnation method.

Furthermore, it is not necessary to start with a supported noble metal catalyst. In a commonly assigned patent, U.S. Pat. No. 4,513,094, it was demonstrated that one could form a platinum-vanadium alloy in one steo. The important processing step is the intimate mixing of the alloying elements of the catalyst. As will be realized, alternate methods exist for bringing the constituents together prior to heat treatment and ordered alloy formation. The solution of these materials in intimate contact is evaporated to dryness to form a resultant mixture. The resultant mixture is then heated to about eight hundred fifteen (815) degrees Celsius to about nine hundred eighty (980) degrees Celsius in a non-oxidizing gas to create with the carbon a reducing environment to form the catalyst.

Both processes for producing the ternary catalyst having an ordered structure include the step of heat treating the supported noble metal or alloy of the supported noble metal in a preselected atmosphere to promote the formation or the catalyst as an ordered solid solution.

In one process (Process I), the heat treatment precedes the two steps mentioned for making the disordered catalyst. The heat pretreatment includes the steps of: one, heating the finely divided noble metal supported on an electrically conductive support, such as carbon-black, in a hydrogen atmosphere to a predetermined temperature range of about six hundred (600) degrees Celsius to eight hundred (800) degrees Celsius for a period of one to three hours; and, two, cooling said supported noble metal catalyst in a non-oxidizing atmosphere, such as a flowing nitrogen atmosphere. Thereafter, the finely divided noble metal is contacted with the compound of cobalt and an element from the transition group and the process proceeds as set forth above.

In the second process (Process II), the heat treatment follows the two steps mentioned for making the disordered catalyst. The heat post-treatment includes cooling the supported ternary alloy in an inert atmosphere at a rate which enables the formation of the ordered solid solution. Cooling the solution at a rate which is too great from a temperature at which the structure is disordered will freeze the structure in the disordered state. Thus, the disordered ternary alloy catalyst was formed from finely divided platinum supported on electrically conductive carbon-black particles on which was deposited cobalt and chromium compounds by first heating and reducing the mixture in a nitrogen atmosphere at temperatures from about eight hundred and fifteen (815) degrees Celsius to about nine hundred eighty (980) degrees Celsius.

Thereafter, the supported ternary alloy in a disordered state was cooled in an inert atmosphere at a rate which enables the formation of the ordered solid solution. In one embodiment, the catalyst formed was cooled to a temperature in the range of five hundred and forty (540) degrees Celsius to about six hundred and fifty (650) degrees Celsius and keeping the catalyst within this temperature range for a period of about one hour. Since formation of the ordered structure is a function of time at temperature, it may be possible to obtain the ordered structure at a slightly lower temperature for a longer period of time or at a slightly higher temperature at a shorter period of time.

These procedures are applicable to the preparation of both supported and unsupported catalysts. However, since finely divided unsupported noble metals are generally limited to surface areas of less than 50 m²/gm, the described method is best practised using a finely divided noble metal deposited on electrically conductive support material which can be prepared with surface areas in excess of 100 m²/gm. One commonly used support is carbon powder which may be made or purchased commercially either in an amorphous form or a more graphitized form. Some electrically conductive supports which are available commercially and can be used are acetylene-black (Gulf Oil Corporation) or Vulcan XC-72, an oil furnace black from Cabon Corporation. As mentioned, these carbon-blacks may be used as supports in their as-received condition or may be graphitized to increase their oxidation resistance prior to depositing the noble metal.

The noble metal can be deposited onto an electrically conductive support by and conventional means disclosed in the prior art (i.e. commonly assigned U.S. Pat. No. 4,137,373 the disclosure of which is incorporated by reference), or the finely divided noble metal already supported may be purchased commercially. In addition to providing a support for the catalyst, these carbon supports will provide the reducing environment necessary to form the alloy during heat treatment.

Catalysts prepared using the above methods are ternary alloy catalysts containing a noble metal, a metal from transition Group IV to Group VII and cobalt. As mentioned in commonly assisned U.S. Pat. No. 4,447,506, it has been determined that the addition of cobalt significantly enhances the overall catalytic activity relative to the unalloyed noble metal constituent. Platinum is the preferred noble metal while chromium is the preferred metal selected from the defined Groups. Although the invention has been described in terms of platinum-chromium-cobalt, if one were willing to suffer a slight decrease in activity (as shown by the decrease for the unordered alloy in the Table) other metals selected from the above-described Groups can be substituted for the chromium. It is expected that the decrease shown will be offset for long term operation to some extent by forming the ternary alloy structure as an ordered catalyst.

The following two examples illustrate two methods of forming a ternary alloy catalyst having a disordered structure. Using these methods in conjunction with either of the two processes mentioned above will result in a catalyst having an ordered structure.

EXAMPLE 1

A platinum-chromium-cobalt alloy catalyst of high surface area supported on carbon was prepared in the following manner:

Five grams of commercially available high surface area platinum-on-graphitized-carbon-black (containing 10% platinum by weight) was dispersed in 200 ml of water followed by ultrasonic blending for about 15 minutes. The pH was adjusted to about 8 with dilute ammonium hydroxide solution to aid in the dispersion of the supported catalyst. Stirring was continued during and after pH adjustment. A solution of 1 gm of ammonium chromate in 20 ml of water was then added to the pH-adjusted solution. Following this addition, the pH was brought to about 5.5 by addition of dilute hydrochloric acid to facilitate deposition, probably by adsorption, of the chromium onto the platinum. The solution was then stirred, to intimately contact the platinum-on-graphitized-carbon-black and the chromium salt, for about 15 minutes. A separate solution of 3 gm of cobaltous nitrate in 20 ml of water was then added to the above acidic solution. Both the ammonium chromate and cobaltous nitrate are added as solutions to enhance the dispersion of these metals onto the catalyst, while the stirring brings the metals into the intimate contact required for proper deposition, probably by adsorption onto the supported platinum catalyst. The pH was maintained at about 5.5 by incremental additions of dilute hydrochloric acid. Stirring was employed during this procedure and continued for about 15 minutes after the addition to intimately contact all the constituents.

After filtering, the solids were dried at about ninety (90) degrees Celsius and sifted through an 80 mesh screen.

The sifted solids were then heat treated at about nine hundred (900) degrees Celsius in flowing nitrogen for 1 hour to form the platinum-chromium-cobalt alloy catalyst. As will be realized, all such heat treatments are performed in an environment that removes the products of reaction so that they not interfere with the formation of the catalyst. In this particular example, the flowing gas provides that function but other approaches may be utilized. The catalyst prepared according to this method, which showed an increase in catalytic activity over that of the unalloyed suoported platinum, had a metallic composition comprising cobalt 11.3% by weight, chromium 8.9% by weight with the balance being platinum. This catalyst was characterized by X-ray diffraction and found to be a disordered alloy. Other satisfactory catalysts made using this method contained concentrations of cobalt from 8-16% by weight, chromium 6-12% by weight, with platinum being the balance. In all cases, the platinum was supported on graphitized carbon-black.

EXAMPLE 2

A second ternary alloy catalyst was prepared using the method of Example 1. This catalyst was comprised of platinum, vanadium, and cobalt. The vanadium was introduced onto the catalyst in place of the chromium by substituting a solution of ammonium meta vanadate in place of the ammonium chromate solution. This catalyst was characterized by X-ray diffraction and found to be a disordered alloy.

EXAMPLE 3

The catalyst of Example 1 was also made using the hydrogen pretreatment method (process 1) prior to adsorbing the cobalt and chromium on the support platinum. This catalyst was characterized by X-ray diffraction and found to be an ordered solid solution alloy.

EXAMPLE 4

An ordered solid solution platinum-cobalt chromium alloy catalyst of high surface area supported on carbon powder was prepared using the impregnation method followed by process II.

Five grams of commercially available high surface area platinum-on-graphitized-carbon-black (containing 10 percent by weight platinum) was dispersed in 80 ml of water. The dispersion was ultrasonically blended for two minutes. A solution of 0.4475 grams of cobaltous nitrate and 20 ml of water was added to the catalyst-water dispersion. This solution was then stirred for 15 minutes to bring the platinum and cobalt species into intimate contact. A solution of 0.4102 grams of chromium nitrate in the form of chromic nitrate and 20 ml of water was then added to the platinum-cobalt solution. The pH was adjusted to 5.5 to enhance adsorption of the metallic species. This system was then ultrasonically blended for two minutes and then stirred for 15 minutes while maintaining the pH at 5.5. The slurry was then heated to evaporate the water. The dried solids were then sieved through an 80 mesh screen.

The solids were then heated to about nine hundred (900) degrees Celsius in flowing nitrogen and held for one hour. The temperature was lowered to about six hundred (600) degrees Celsius and held for one hour before cooling to room temperature. The catalyst prepared according to this method, which showed an increase in catalytic activity over supported unalloyed platinum, had a metallic composition of about 50 atomic percent platinum, 30 atomic percent cobalt, and 20 atomic percent chromium, Pt, $Co_{0.6} Cr_{0.4}$. In this particular ternary alloy, the platinum is about 78% by weight, the cobalt is about 14% by weight, and the chromium is about 8% by weight. X-ray diffraction of the catalyst revealed the presence of superlattice lines indicating an ordered solid solution alloy.

The catalysts of Examples 1, 2, 3 and 4 were tested to demonstrate their superiority over the supported unalloyed catalyst as well as their respective binary counterparts. Cathodes were made from each of the alloys that had been prepared as described in the above Examples and tested in subscale 2"×2" laboratory fuel cells. The cells were run and the voltage measured at a current density of 200 ASF (amps per square foot). All of the electrodes contained the same platinum loading i.e. 0.5 mg of $Pt/cm^2$ electrode. Each of the catalyst's performance was evaluated at standard conditions i.e. a cell current density of 200 ASF, 99% phosphoric acid electrolyte, one hundred and ninety (190) degrees Celsius cell temperature with air at a high flow rate as the reacting gas and with the voltage at the given current corrected to eliminate cell resistance (IR-free).

The data in the Table demonstrates an increase in the catalytic activity for the electrochemical reduction of oxygen in excess of two and one-half times that of the supported unalloyed platinum, for both the unordered platinum-chromium-cobalt catalyst and the process II ordered platinum-chromium-cobalt catalyst with the catalytic activity of the process II ordered catalyst being greater than the catalytic activity of the unordered catalyst.

The Table also shows that the unordered ternary alloy catalyst of platinum-chromium-cooalt has an increase over the binary alloy catalyst of platinum-chromium in its activity for the electrochemical reduction of oxygen of 20%, the process II ordered ternary alloy catalyst an increase of 25% and the process I ordered ternary alloy catalyst an increase of about 5%. The unordered platinum-vanadium-cobalt ternary alloy catalyst also has a higher activity compared to the platinum-vanadium binary alloy, but not as great as that of the preferred platinum-chromium-cobalt catalyst. It is expected that ordering the platinum-vanadium-cobalt ternary alloycatalyst will result in an even greater activity for this cobalt containing catalysts (immediately for process II catalysts and over the long term for both catalysts); and, even more importantly, a greater stability in the phosphoric acid fuel cell.

TABLE

| Supported Alloy Catalyst | $O_2$ Activity @ 0.9 volts mA/mg Pt | $H_2$ Air IR-Free Cell Voltage @ 375° F. @ 200 ASF (190.56° C.) |
| --- | --- | --- |
| Pt—Cr—Co (ordered) ordered-Process II | 54 | 0.744 |
| Pt—Cr—Co (disordered) | 52 | 0.742 |
| Pt—Cr—Co (ordered) ordered-Process I | 45 | 0.737 |
| Pt—Cr (disordered) | 43 | 0.735 |
| Pt—V—Co (disordered) | 42 | 0.735 |
| Pt—V (disordered) | 39 | 0.720 |
| Pt | 20 | 0.680 |

In addition, an increase in the current density at a fixed voltage was observed over its binary alloy counterpart without the cobalt for the unordered supported ternary alloy catalysts in excess of 20% in excess of 25% for the process II ordered catalyst and 5% for the process I ordered catalyst. This is illustrated in FIG. 6.

Figure 6:
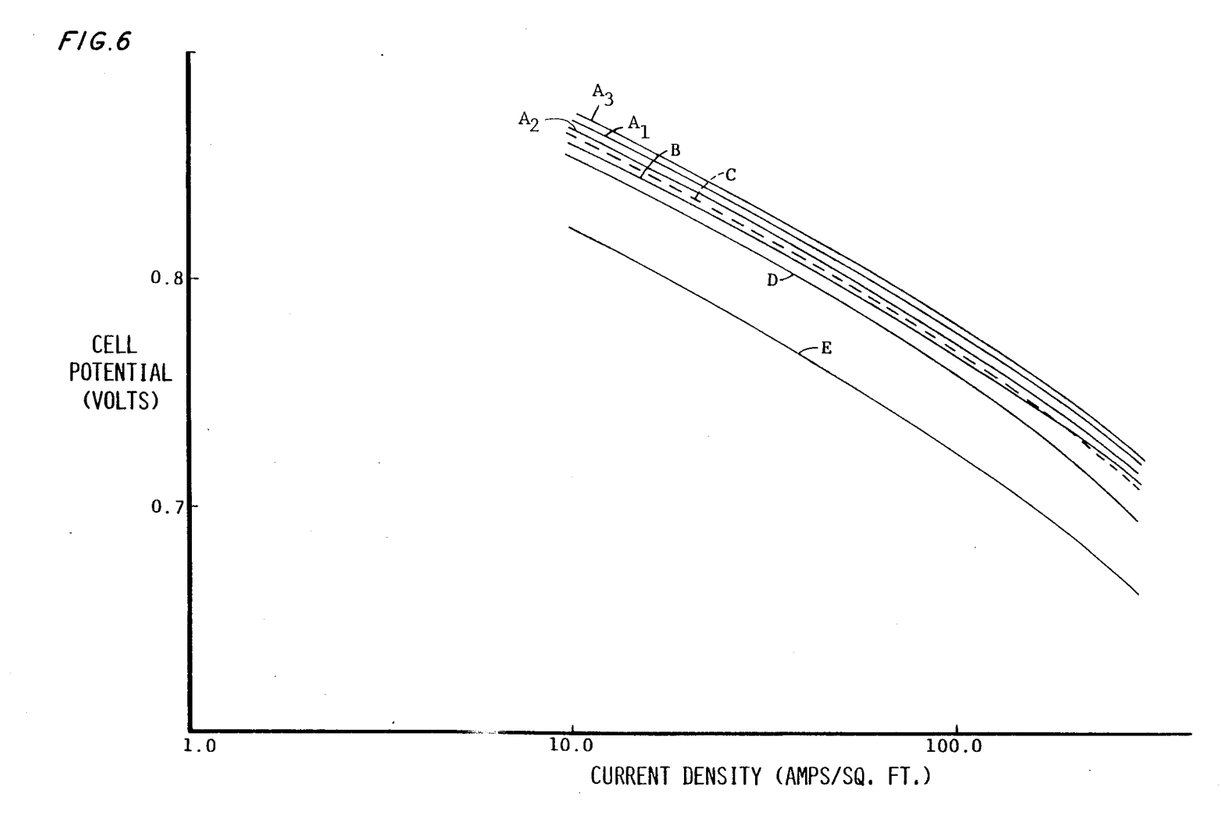
FIG. 6 is a graphical representation of cell voltage as a function of current density for various cathodes incorporating alloy catalysts and platinum.

The letters in FIG. 6 represent the following unordered catalysts, "A₁" platinum-chromium-cobalt, "B" platinum-chromium, "C" platinum-vanadium-cobalt, "D" platinum-vanadium and "E" platinum. The letter "Ahd 2" represents the process I ordered platinum-chromium-cobalt catalyst and A₃ the process II ordered platinum-chromium cobalt catalyst. Each of these catalysts is supported on the same graphitized carbon support material.

This increase in current density has considerable significance in light of the fact that current density is a measure of the rate at which a fuel cell can do useful work and the voltage of a cell is a measure of its efficiency; therefore, a fuel cell utilizing catalysts described in the present invention will be able to increase the amount of work the cell can produce while the cell operates at the same efficiency.

A further interesting effect is observed in comparing the performance of the ordered solid solution catalyst made by heat treating the unordered catalyst (Example 4)-process II to the performance of the ordered solid solution catalyst (Example 3)-process I made by heat treating the platinum supported on electrically conductive carbon-black particles prior to contacting the particles with compounds of cobalt and chromium. The performance of the Example 4 catalyst initially exhibted a significantly better mass activity when used in a fuel cell (15% better). This mass actvity decreased over time (several hundreds of hours) until the catalyst exhibited the same mass activity as the catalyst of Example 3. Because both catalysts had the same specific activity at the start of performance, it is believed that the process of Example 4 (process II) provides a catalyst having a greater surface area or more reactive sites than the process of Example 3 (process I).

In addition to their performance advantage, these ordered platinum-cobalt-chromium alloy catalysts have demonstrated increased stability over non-ordered alloys of similar composition. This stability has been observed in subscale fuel cell tests at temperatures up to 400° F. For operating times, up to 9,000 hours, the ordered alloy has retained its ordered structure and chemical composition. These quantities were measured by X-ray diffraction and Scanning Transmission Electron Microscopy with an Energy Dispersive X-Ray Spectrometer (micro-chemical analysis). Non-ordered alloys have not demonstrated this physical and chemical stability when operated under similar conditions. This unexpected improvement in stability is important in maintaining the high efficiency of fuel cell power plants.

The alloy catalysts of this invention have particular utility as catalysts for the electrochemical reduction of oxygen. This activity makes these catalysts particularly suitable for use in acid fuel cells. However, these catalysts may find alternative applications in the chemical, pharmaceutical, automotive and anti-polution fields.

Although the invention has been shown and described with respect to detailed embodiments thereof, it should be understood by those skilled in the art that various changes in form and detail thereof may be made without departing from the spirit and the scope of the claimed invention.

We claim:

1. A ternary metal alloy catalyst comprising cobalt, a noble metal selected from the group consisting of platinum, iridium, rhodium, and palladium, and an element selected from the group consisting of transition Groups IV, V, VI and VII dispersed on an electrically conductive carbon-powder, said catalyst having a structure which is an ordered solid solution and a catalytic activity for the electrochemical reduction of oxygen at least twice that of an unalloyed platinum catalyst dispersed on the same electrically conductive carbon-powder.

2. The ternary alloy metal catalyst of claim 1 wherein said ternary alloy is platinum, cobalt, and chromium and wherein said catalytic activity is at least two and one-half times that of said supported unalloyed platinum catalyst.

3. The catalyst of claim 2 wherein the chromium is 6–12% by weight, the cobalt is 8–16% by weight and the balance is platinum.

4. The catalyst of claim 3 wherein the platinum is about 78% by weight, the cobalt is about 14% by weight, and the chromium is about 8% by weight.

5. A method for making a ternary metal alloy catalyst including the steps of, first, intimately contacting a finely divided noble metal, which is supported on an electrically conductive carbon support and which is selected from the group consisting of platinum, iridium, rhodium and palladium with a compound of an element selected from transition Groups IV, V, VI and VII and a compound of cobalt, and, second heating and reducing the intimately contacted materials in a non-oxidizing atmosphere to form the supported noble metal catalyst, wherein the improvement comprises the additional step of:

heat treating the supported noble metal or alloy of the supported noble metal in an atmosphere which promotes the formation of the catalyst as an ordered solid solution and which includes cooling the supported noble metal or cooling the supported noble metal alloy of the catalyst at a rate which enables the formation of the ordered solid solution.

6. The method for making the ternary noble metal alloy catalyst of claim 5 wherein the catalyst formed by step 2 is cooled in an inert atmosphere.

7. The method for making the ternary noble metal catalyst of claim 6 wherein step two includes the step of heating the contacted materials to a temperature in the range of about eight hundred and fifteen (815) degrees Celsius to about nine hundred and eighty (980) degrees Celsius and wherein the step of cooling the catalyst includes cooling the catalyst formed to a temperature in the range of about five hundred and forty (540) degrees Celsius to about six hundred and fifty (650) degrees Celsius and keeping the catalyst within this temperature range for a period of about one hour.

8. The method for making the ternary noble metal alloy catalyst of claim 8 wherein the additional step is performed prior to step one and includes the steps of heating the finely divided noble metal supported on electrically conductive carbon-support in a hydrogen atmosphere to a temperature in the range of about six hundred (600) degrees Celsius to eight hundred (800) degrees Celsius for a period of one to three hours and cooling said supported noble metal in a non-oxidizing atmosphere.

9. The method for making the ternary noble metal catalyst of claims 6, 7, or 8 wherein the noble metal is platinum.

10. The method for making the ternary noble metal catalyst of claim 9 wherein the cobalt compound is cobaltous nitrate.

11. The method for making the ternary noble metal catalyst of claim 10 wherein the element from said transition groups is chromium.

12. The method for making the ternary noble metal catalyst of claim 11 wherein the compound containing the element is ammonium chromate.

13. The method of claim 11 for making the ternary noble metal catalyst wherein the compound containing the element is chromium nitrate.

14. A method for making a supported ternary metal alloy catalyst having a structure which is an ordered solid solution, comprising:
   dispersing finely divided platinum supported on electrically conductive carbon-black particles in water;
   preparing separate aqueous solutions of cobalt and chromium compounds;
   sequentially adding each solution to the platinum-carbon dispersion;
   bringing into intimate contact the platinum cobalt and chromium species;
   evaporating to dryness the resultant mixture of platinum, cobalt, and chromium species;
   heating and reducing the mixture of particles in a flowing nitrogen atmosphere at temperatures from about eight hundred and fifteen (815) degrees Celsius to about nine hundred eighty (980) degrees Celsius to form the supported ternary alloy catalysts; and,
   cooling the supported ternary alloy in an inert atmosphere at a rate which promotes the formation of the ordered solid solution.

15. The method for making the ternary metal alloy catalyst of claim 14 wherein the step of cooling the catalyst includes cooling the catalyst formed to a temperature range of five hundred and forty (540) degrees Celsius to six hundred and fifty (650) degrees Celsius and keeping the catalyst within this temperature range for a period of about one hour.

16. A ternary metal alloy catalyst made by the method which includes the steps of, first, intimately contacting a finely divided noble metal, which is supported on an electrically conductive carbon support and which is selected from the group consisting of platinum, iridium, rhodium and palladium with a compound of an element selected from transition Groups IV, V, VI and VII and a compound of cobalt, and, second, heating and reducing the intimately contacted materials in a non-oxidizing atmosphere to form the supported noble metal catalyst, wherein the improvement comprises the additional step of:
   heat treating the supported noble metal or alloy of the supported noble metal in an atmosphere which promotes the formation of the catalyst as an ordered solid solution and which includes cooling the supported noble metal or cooling the supported noble metal alloy of the catalyst at a rate which enables the formation of the ordered solid solution.

17. The ternary noble metal alloy catalyst of claim 16 wherein the catalyst formed by step 2 is cooled in an inert atmosphere at a rate which enables the formation of the ordered solid solution.

18. Ternary noble metal catalyst of claim 17 wherein step two includes the step of heating the contacted materials to a temperature in the range of about eight hundred and fifteen (815) degrees Celsius to about nine hundred and eighty (980) degrees Celsius and wherein the step of cooling the catalyst includes cooling the catalyst formed to a temperature in the range of about five hundred and forty (540) degrees Celsius to about six hundred and fifty (650) degrees Celsius and keeping the catalyst within this temperature range for a period of about one hour.

19. The ternary noble metal alloy catalyst of claim 16 wherein the additional step is performed prior to step one and includes the steos of heating the finely divided noble metal supported on electrically conductive carbon-support in a hydrogen atmosphere to a temperature in the range of about six hundred (600) degrees Celsius to eight hundred (800) degrees Celsius for a period of one to three hours and cooling said supported noble metal in non-oxidizing atmosphere.

20. The ternary noble metal catalyst of claims 17, 18, or 19 wherein the noble metal is platinum.

21. The ternary noble metal catalyst of claim 20 wherein the cobalt compound is cobaltous nitrate.

22. The ternary noble metal catalyst of claim 21 wherein the element is chromium.

23. The ternary noble metal catalyst of claim 22 wherein the compound is ammonium chromate.

* * * * *

UNITED STATES PATENT AND TRADEMARK OFFICE
CERTIFICATE OF CORRECTION

PATENT NO.  : 4,677,092

DATED       : June 30, 1987

INVENTOR(S) : Francis J. Luczak et. al.

It is certified that error appears in the above-identified patent and that said Letters Patent is hereby corrected as shown below:

Col. 10, line 57, after "claim" change "8" to --5--

Col. 12, line 38, after "in" insert --a--

Signed and Sealed this

Twenty-third Day of May, 1989

Attest:

DONALD J. QUIGG

Attesting Officer

Commissioner of Patents and Trademarks